United States Patent
Nagai et al.

(10) Patent No.: US 9,046,434 B2
(45) Date of Patent: Jun. 2, 2015

(54) LOAD CELL INCLUDING EXCESS LOAD PREVENTING MECHANISM

(75) Inventors: Takayuki Nagai, Kobe (JP); Makoto Makabe, Akashi (JP)

(73) Assignee: YAMATO SCALE CO., LTD., Akashi-shi, Hyogo (JP)

( * ) Notice: Subject to any disclaimer, the term of this patent is extended or adjusted under 35 U.S.C. 154(b) by 0 days.

(21) Appl. No.: 13/879,015

(22) PCT Filed: Oct. 15, 2010

(86) PCT No.: PCT/JP2010/006137
§ 371 (c)(1),
(2), (4) Date: Jun. 24, 2013

(87) PCT Pub. No.: WO2012/049714
PCT Pub. Date: Apr. 19, 2012

(65) Prior Publication Data
US 2013/0269449 A1    Oct. 17, 2013

(51) Int. Cl.
G01L 1/00       (2006.01)
G01L 5/00       (2006.01)
G01L 1/04       (2006.01)
G01L 1/26       (2006.01)
G01G 23/00      (2006.01)
G01L 1/22       (2006.01)
G01G 21/24      (2006.01)

(52) U.S. Cl.
CPC .............. G01L 1/26 (2013.01); G01G 23/005 (2013.01); G01L 1/2243 (2013.01); G01G 21/24 (2013.01)

(58) Field of Classification Search
USPC ..................... 73/862.382, 862.362
See application file for complete search history.

(56) References Cited

U.S. PATENT DOCUMENTS 4,419,902 A * 12/1983 Somal ............... 73/862.633
4,467,661 A *  8/1984 Somal ............... 73/862.382
(Continued)

FOREIGN PATENT DOCUMENTS

DE   27 53 549 B1   5/1979
JP   46-21998       7/1971
(Continued)

OTHER PUBLICATIONS

International Search Report for PCT/JP2010/006137, mailed Nov. 9, 2010.
(Continued)

*Primary Examiner* — Lisa Caputo
*Assistant Examiner* — Jamel Williams
(74) *Attorney, Agent, or Firm* — Marshall, Gerstein & Borun LLP

(57) ABSTRACT

A load cell includes a horizontal upper beam; a lower beam extending parallel with the upper beam; a fastening section connecting one end of the upper beam to the lower beam and is fastened to a stationary object; a movable section which connects the upper beam and the lower beam and is displaced vertically by a load applied to the movable section 5; and a cylindrical stopper having a circular cross-section. The fastening section has a first circular hole. The movable section has a second circular hole concentric with the first circular hole. A base end portion of the stopper is fastened to the first circular hole and a tip of the stopper member 7 is located at an inner side of the second circular hole such that there is a space of a specified width between the tip and an inner surface of the second hole.

3 Claims, 5 Drawing Sheets

(56) References Cited

U.S. PATENT DOCUMENTS

| | | | |
|---|---|---|---|
| 4,762,006 A * | 8/1988 | Asakawa et al. | 73/862.044 |
| 4,899,599 A * | 2/1990 | Eddens | 73/862.382 |
| 6,422,096 B1 * | 7/2002 | Bulat | 73/862.381 |
| 6,837,117 B2 * | 1/2005 | Munz et al. | 73/862.629 |
| 6,923,038 B2 * | 8/2005 | Klovning | 73/9 |
| 7,040,178 B1 * | 5/2006 | Perkins | 73/856 |
| 7,437,943 B2 * | 10/2008 | Munz et al. | 73/849 |
| 2002/0178841 A1 * | 12/2002 | Kobayashi et al. | 73/862.629 |
| 2003/0097887 A1 * | 5/2003 | LaVar | 73/862.639 |

FOREIGN PATENT DOCUMENTS

| | | |
|---|---|---|
| JP | 62-47929 | 3/1987 |
| JP | 62-7047929 U | 3/1987 |
| JP | 63-271129 | 11/1988 |
| JP | 64-068630 | 3/1989 |
| JP | 01-191028 | 8/1989 |
| JP | 9-288019 A | 11/1997 |
| JP | 2009-244130 A | 10/2009 |
| JP | 2009244130 A * | 10/2009 |

OTHER PUBLICATIONS

Notice of Reasons for Rejection for Japanese Patent Application No. 2009-101032, mailed Apr. 16, 2013.

Office Action for JP 2009-101032, dated Apr. 16, 2013.

Extended European Search Report for EP 10 85 8372, mailed Mar. 6, 2014.

* cited by examiner

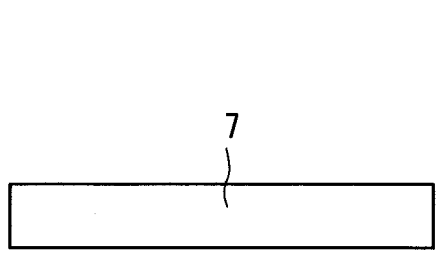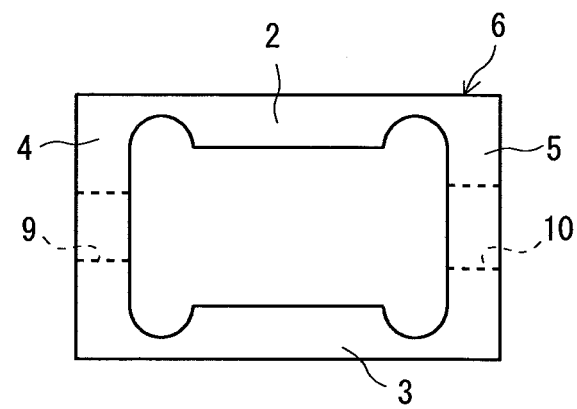
Fig. 3A　　　　　　　　　Fig. 3B
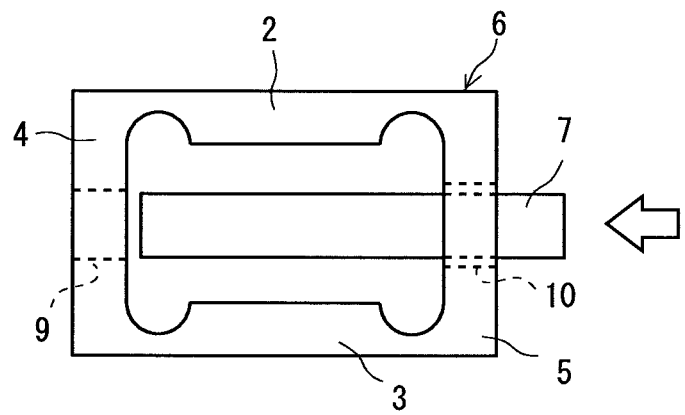
Fig. 3C
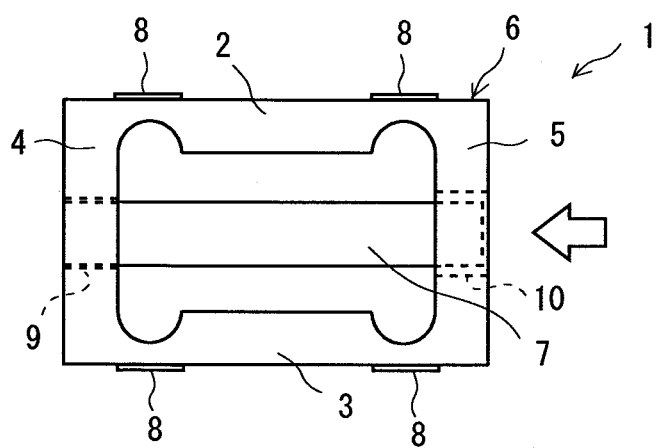
Fig. 3D

LOAD CELL INCLUDING EXCESS LOAD PREVENTING MECHANISM

TECHNICAL FILED

The present invention relates to a Roberval-type load cell. Particularly, the present invention relates to a load cell including an excess load preventing mechanism for preventing damages to the load cell which would be caused by an excess load.

BACKGROUND ART

A Roberval-type load cell uses a Roberval mechanism which is not affected by a position of objects, and is widely used for weighing in weighers (scales). FIG. 4 is a schematic view of a general Roberval-type load cell 41. As shown in FIG. 4A, the general Roberval-type load cell 41 includes an upper beam section 42 located at an upper portion, a lower beam section 43 located at a lower portion, a fastening section 44 fastened to a stationary object such as a device body, and a movable section 45 applied with a vertical external force, and entirely has a rectangular shape. Four strain gauges 46 are attached to both ends of an outer peripheral surface of the upper beam section 42 and both ends of an outer peripheral surface of the lower beam section 43.

When a load is applied to the load cell 41 in a direction indicated by an arrow in FIG. 4B, the entire load cell 41 strains. According to this strain, the strain gauges 46 attached to a left upper portion and a right lower portion extend, and the strain gauges 46 attached to a right upper portion and a left lower portion contract, among the strain gauges 46 attached to the four locations in FIG. 4B. As the load applied to the load cell 41 increases, a degree of strain of the strain gauges 46 increases, as a matter of course. The strain gauge 46 has a characteristic in which its electric resistance changes according to a degree of extension or contraction. Because of the characteristic, the electric resistance of the strain gauge 46 is converted into a voltage by a Wheatstone bridge circuit, and a voltage value is obtained, thereby detecting a magnitude of the load applied to the load cell 41.

However, since the Roberval-type load cell 41 has the above configuration, the load cell 41 strains significantly and thereby the strain gauges 46 may possibly be damaged if an excess load is applied to the load cell 41. To prevent an excess load from being applied to the load cell 41, generally, a stopper member 47 is provided outside of the load cell 41 or on a body of the load cell 41. For example, as shown in FIG. 4, the stopper member 47 is provided below the movable section 45. In a layout in which the stopper member 47 is provided with a space below the movable section 45, as shown in FIG. 4, when the movable section 45 is displaced by a distance equal to the space and contacts the stopper member 47, the movable section 45 is not displaced any more. This makes it possible to prevent an excess load from being applied to the load cell 41.

FIG. 5 shows another mechanism. FIG. 5 is a perspective view of a Roberval-type load cell 51 having a mechanism different from that of FIG. 4. In the load cell 51 of FIG. 5, a fastening section 54 is provided with a groove at a near side in FIG. 5, and a plate-shaped stopper member 57 is fastened to the groove. In addition, a movable section 55 is provided with a groove at a near side in FIG. 5. A width of the groove formed in the movable section 55 is greater than a width of the stopper member 57. A vertical slight space (gap) is formed between the groove of the movable section 55 and the stopper member 57. In the load cell 51 of FIG. 5, having this configuration, when the movable section 55 is applied with a load and displaced, inner side of the groove formed in the movable section 55 contacts the stopper member 57, so that the movable section 55 is not displaced any more. This makes it possible to prevent an excess load from being applied to the load cell 51.

Patent Literature 1 discloses another mechanism (see FIGS. 1 to 4 in Patent Literature 1). Patent Literature 1 discloses that stoppers are provided from both of an upper beam and a lower beam toward inside. These stoppers are provided such that there is a little space (gap) in a rightward and leftward direction. Because of this, when the load cell is applied with an external force and thereby strains, these stoppers are displaced in the rightward and leftward direction and contact the load cell, so that the movable section is not displaced any more. This makes it possible to prevent an excess load from being applied to the load cell.

CITATION LIST

Patent Literature

Patent Literature 1: Japanese Patent Application Laid-Open Publication No. Hei. 9-288019

SUMMARY OF INVENTION

Technical Problem

As a Roberval-type load cell including an excess load preventing mechanism, the above example is provided. In an actual load cell, a movable section is displaced to a very small degree (although the spaces (gaps) provided near the stopper members 47 and 57 are depicted as having relatively great dimensions in the example of FIGS. 4 and 5, there is a little space (gap) in actual configuration). It is necessary to position each of the stopper members 47 and 57 so that the space (gap) between each of the stopper members 47 and 57 and an opposing component is adjusted by 1/100 millimeters. Because of this, it is very difficult to perform a work for disposing the stopper member 47 so that the space (gap) between the movable section 45 and the stopper member 47 has a proper space (gap). In the case of the load cell 51 of FIG. 5, a swaging work is performed for a boundary portion between the groove of the fastening section 54 and the stopper member 57 to fasten them to each other. In this work, frequently, the stopper member 57 is displaced with respect to the groove of the movable section 55, and a mounting work is very difficult. In the case of the load cell disclosed in Patent Literature 1, it is necessary to perform processing such that the space (gap) between the stoppers is very small. Such processing is very difficult, too.

The present invention has been developed to solve the above described problems, and an object of the present invention is to provide a load cell which includes a stopper member for preventing an excess load from being applied to the load cell to prevent damages to the load cell which would be caused by the excess load, and allows a mounting work of the stopper member to be carried out accurately and easily.

Solution to Problem

The present invention has been developed to solving the above stated problem, and a load cell of the present invention is Roberval-type load cell, comprising: an upper beam section extending horizontally; a lower beam section extending below the upper beam section in parallel with the upper beam section; a fastening section which connects one end of the upper beam section and one end of the lower beam section to each other and is fastened to a stationary object; a movable section which connects the other end of the upper beam section and the other end of the lower beam section to each other and is displaced vertically by a load applied vertically to the movable section; and a cylindrical stopper member having a circular cross-section; wherein the fastening section has a first circular hole having a circular cross-section; wherein the movable section has a second circular hole having a circular cross-section and being concentric with the first circular hole; and wherein a base end portion of the stopper member is fitted into and fastened to the first circular hole and a tip end portion of the stopper member is located at an inner side of the second circular hole such that there is a space (gap) of a specified width between the tip end portion and an inner surface of the second circular hole.

In accordance with this configuration, by performing relatively simple processing in which the first circular hole and the second circular hole are formed such that their cross-sections have circular shapes which are concentric with each other and the stopper member is formed such that the base end portion has a dimension to allow the base end portion to be fastened to the first circular hole and the tip end portion has a dimension to allow a space (gap) of a predetermined width to be formed between the tip end portion and an inner surface of the second circular hole, the stopper member can be mounted accurately by merely inserting the base end portion of the stopper member into the first circular hole. Therefore, in accordance with the present invention, a mounting work of the stopper member can be carried out accurately and easily.

In the load cell, the first circular hole may have an inner diameter equal to an inner diameter of the second circular hole; and the tip end portion of the stopper member may have an outer diameter smaller than an outer diameter of the base end portion of the stopper member.

In the load cell, the first circular hole may have an inner diameter smaller than an inner diameter of the second circular hole; and the tip end portion of the stopper member may have an outer diameter equal to an outer diameter of the base end portion of the stopper member.

Advantageous Effects of the Invention

In accordance with the present invention, it is possible to provide a load cell which allows a mounting work of the stopper member to be carried out accurately and easily.

BRIEF DESCRIPTION OF THE DRAWINGS

FIG. 3 is a view showing a manufacturing method of a load cell according to Embodiment 2 of the present invention.

DESCRIPTION OF THE EMBODIMENTS

Hereinafter, embodiments of a load cell according to the present invention will be described with reference to the drawings. Throughout the drawings, the same or corresponding components are identified by the same reference symbols and will not be described in repetition.

Embodiment 1

Figure 1:
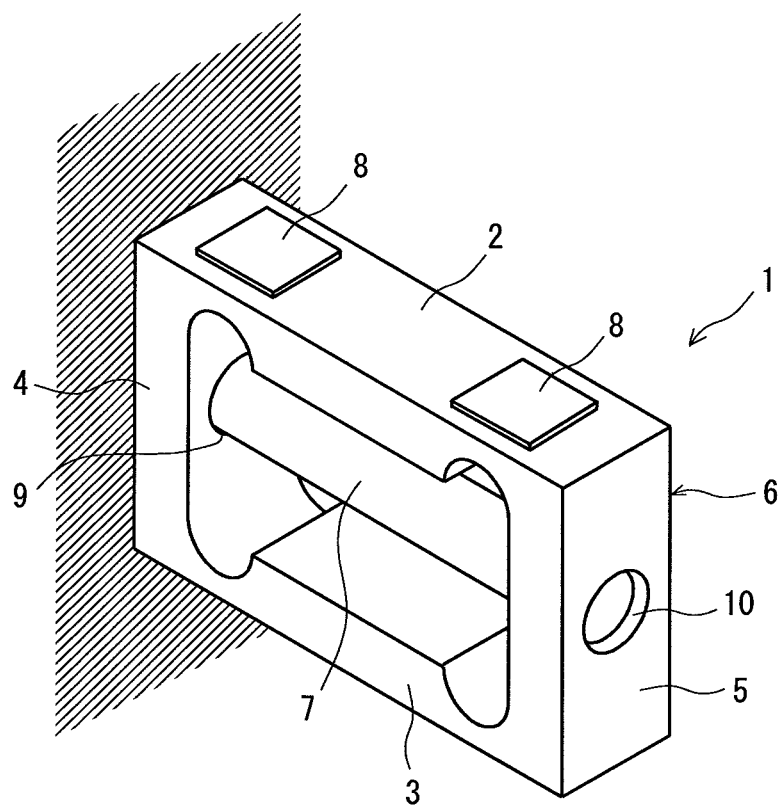
FIG. 1 is a perspective view of a load cell according to Embodiment 1 of the present invention.

Firstly, a load cell 1 according to Embodiment 1 of the present invention will be described. FIG. 1 is a perspective view of the load cell 1 according to the present embodiment. As shown in FIG. 1, the load cell 1 of the present embodiment is a Roberval-type load cell. The load cell 1 mainly includes a load cell body 6 including an upper beam section 2, a lower beam section 3, a fastening section 4, and a movable section 5, and having a rectangular shape (to be precise, rectangular frame shape), and a stopper member 7. Hereinafter, these components will be described sequentially.

The upper beam section 2 is located at an upper portion of the rectangular load cell body 6, and extends horizontally. Groove-shaped hollow portions are formed on an inner peripheral surface (lower surface) of the upper beam section 2 in locations at the fastening section 4 side and at the movable section 5 side such that the hollow portions extend in a direction perpendicular to a direction in which the upper beam section 2 extends. Strain gauges 8 are attached to an outer peripheral surface (upper surface) of the upper beam section 2 in locations corresponding to the hollow portions, respectively. For example, the load cell body 6 including the upper beam section 2 and the stopper member 7 are made of aluminum. Alternatively, the stopper member 7 and the load cell body 6 may be made of different materials, for example, the stopper member 7 may be made of a material having a higher stiffness than a material of the load cell body 6.

The lower beam section 3 is located at a lower portion of the rectangular load cell body 6, and extends horizontally. The lower beam section 3 extends in parallel with the upper beam section 2 to form a pair with the upper beam section 2. Groove-shaped hollow portions are formed on an inner peripheral surface (upper surface) of the lower beam section 3 in locations at the fastening section 4 side and at the movable section 5 side such that the hollow portions extend in a direction perpendicular to a direction in which the lower beam section 3 extends. Strain gauges 8 (see FIG. 2D) are attached to an outer peripheral surface (lower surface) of the lower beam section 3 in locations corresponding to the hollow portions, respectively.

The fastening section 4 is located at one side portion of the rectangular load cell body 6 and extends vertically. That is, the fastening section 4 connects one end (left side in FIG. 1) of the upper beam section 2 and one end (left side in FIG. 1) of the lower beam section 3 to each other. For example, the fastening section 4 is in contact with and is fastened to a stationary object such as a device body, which is not displaced with respect to a ground, at its outer peripheral surface side. In this structure, even when a vertical load is applied to the load cell 1, the fastening section 4 is not displaced. A first circular hole 9 is formed in a center portion of the fastening section 4. The first circular hole 9 has a circular cross-section, and its center axis extends in parallel with the upper beam section 2 and the lower beam section 3.

The movable section 5 is located at the other side portion of the rectangular load cell body 6 and extends vertically. That is, the movable section 5 is opposite to the fastening section 4 and connects the other end (right side in FIG. 1) of the upper beam section 10 and the other end (right side in FIG. 1) of the lower beam section 3 to each other. The movable section 5 is attached with a weighing platform on which objects are put, a weighing container into which the objects are put, etc., on its upper, lower or outer peripheral surface, and is displaced vertically by a vertical load. The movable section 5 has a second circular hole 10 in a center portion thereof. The second circular hole 10 has a circular cross-section, and its center axis conforms to a center axis of the first circular hole 9. An inner diameter of the second circular hole 10 conforms to an inner diameter of the first circular hole 9. That is, the first circular hole 9 and the second circular hole 10 are coaxial and have an equal inner diameter.

The stopper member 7 is a member for preventing damages to the load cell which would be caused by an excess load. The stopper member 7 has a cylindrical (circular cylinder) shape having a circular cross-section. The stopper member 7 has a base end portion having a greater diameter than its remaining portion. The base end portion is inserted into the first circular hole 9 and fastened to the fastening section 4. A tip end portion of the stopper member 7 is disposed such that there is a space (gap) having a specified width between the tip end portion and an inner side of the second circular hole 10. This is because the base end portion of the stopper member 7 has a dimension to allow the base end portion to be fastened to the inner portion of the first circular hole 9 in a state in which the base end portion is inserted into the first circular hole 9 and the tip end portion has a dimension to allow the space (gap) of the specified width to be formed between the inner surface of the second circular hole 10 and the tip end portion in a state in which the tip end portion is inserted into the second circular hole 10. In the present embodiment, a tip end of the stopper member 7 is configured not to protrude outward from the outer peripheral surface of the movable section 5. This is because if the tip end of the stopper member 7 protrudes outward from the outer peripheral surface of the movable section 5, this tip end will become an obstacle when the weighing platform, and the like are attached to the outer peripheral surface of the movable section 5.

The configuration of the load cell 1 of the present embodiment has been described above. As described above, the load cell 1 of the present embodiment is configured such that the base end portion of the stopper member 7 is fittingly inserted into the first circular hole 9 and fastened to the fastening section 4 and the tip end portion is located at the inner side of the second circular hole 10 such that there is a slight space (gap) between the tip end portion and the inner side of the second circular hole 10. Because of this configuration, when the movable section 5 is displaced by the width of the space (gap), the inner surface of the second circular hole 10 contacts the outer surface of the stopper member 7, thereby restricting movement of the movable section 5. This makes it possible to prevent damages to the load cell 1 (strain gauges 8) which would be caused by application of an excess load to the load cell 1.

Next, manufacturing process steps of the load cell 1 of the present embodiment will be described. FIG. 2 is a view showing the manufacturing process steps of the load cell 1 of the present embodiment. Hereinafter, the manufacturing process steps will be described sequentially with reference to FIGS. 2A to 2D.

Figure 2A:
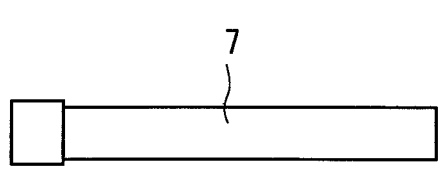
FIG. 2 is a view showing a manufacturing method of the load cell according to Embodiment 1 of the present invention.

Initially, as shown in FIG. 2A, the stopper member 7 is processed. Specifically, a turning process is carried out in such a manner that the stopper member 7 is rotated around its center axis, and its side surface is turned off by a turning tool, etc. In this turning process, the entire stopper member 7 is turned off to a dimension (hereinafter referred to as "first dimension") which allows the stopper 7 to be fitted to the first circular hole 9 in a state in which the stopper member 7 is inserted into the first circular hole 9. Then, a portion of the stopper member 7 which is other than the base end portion is turned off to an outer diameter dimension to allow the space (gap) of the specified width to be formed between the portion and the second circular hole 10. In the present embodiment, the stopper member 7 is processed such that a width (length) of a region of the first dimension is equal to about a thickness of the fastening section 4.

Figure 2B:
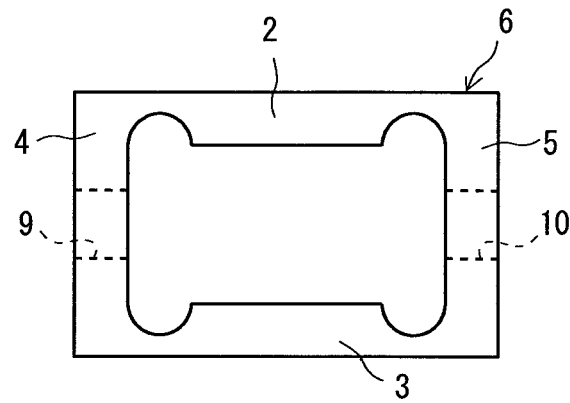

Then, as shown in FIG. 2B, the load cell body 6 is processed. Specifically, a material of a rectangular-parallelepiped shape is hollowed out by a drill and the like, using a milling machine, and the upper beam section 2, the lower beam section 3, the fastening section 4, and the movable section 5 are formed. Alternatively, the load cell body 6 may be formed in such a manner that the upper beam section 2, the lower beam section 3, the fastening section 4, and the movable section 5 may be manufactured separately, and assembled by means of screws. Thereafter, the first circular hole 9 and the second circular hole 10 are formed at the same time by manipulating a drill in a direction from the outer peripheral surface side of the fastening section 4 or from the outer peripheral surface side of the movable section 5. The inner diameter of the first circular hole 9 and the inner diameter of the second circular hole 10 are set to have a dimension to allow the base end portion of the stopper member 7 to be fastened to the first circular hole 9 in a state in which the base end portion of the stopper member 7 is inserted into the first circular hole 9. In this way, the first circular hole 9 and the second circular hole 10 which are equal in diameter and coaxial with each other are formed at the same time.

Figure 2C:
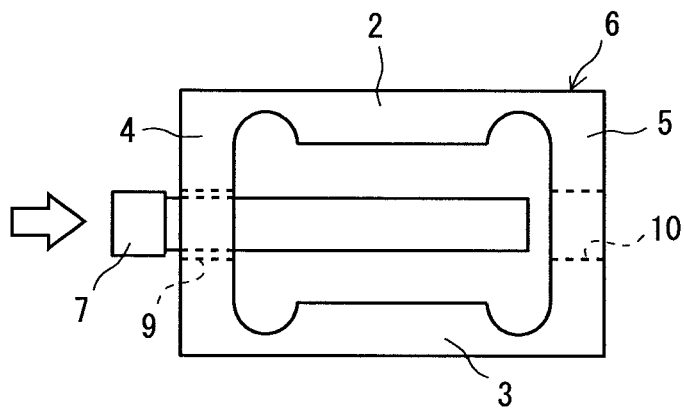

Then, as shown in FIG. 2C, the stopper member 7 is inserted into the load cell body 6 from the outer peripheral surface side of the fastening section 4. Specifically, the stopper member 7 is inserted into the first circular hole 9 and further into the second circular hole 10. It should be noted that the stopper member 7 is inserted such that the tip end portion is forward in the direction in which the stopper member 7 is inserted. Since the outer diameter of the tip end portion of the stopper member 7 is smaller than the inner diameter of the first circular hole 9 and the inner diameter of the second circular hole 10, an insertion work is carried out easily without a resistance by inserting the stopper member 7 such that the tip end portion is forward in the direction in which the stopper member 7 is inserted.

Figure 2D:
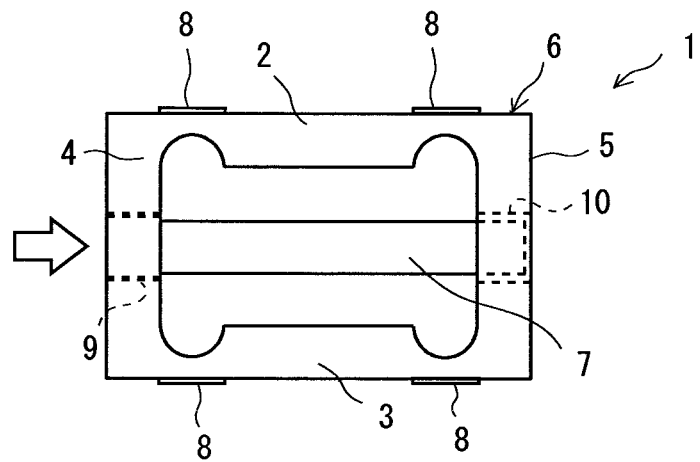

Then, as shown in FIG. 2D, the stopper member 7 is fastened to the load cell body 6. Specifically, the stopper member 7 is further inserted toward the movable section 5 in the state of FIG. 2C. As described above, the base end portion of the stopper member 7 is set to have a dimension to allow the base end portion to be pressed into and fastened to the first circular hole 9. Therefore, when the base end portion of the stopper member 7 is inserted into the first circular hole 9, the stopper member 7 is fastened to the first circular hole 9. If the stopper member 7 protrudes from the first circular hole 9 at the outer peripheral surface side, the protruding portion may be cut. This is because, the stopper member 7 serves as a stopper by inserting even a portion of the tip end portion into the second circular hole 10. Finally, the strain gauges 8 are attached (bonded) to predetermined locations, respectively, thereby completing the load cell 1 of the present embodiment.

The manufacturing process steps of the load cell 1 of the present embodiment have been described above. As should be appreciated from the above, processing for forming the first circular hole 9 and the second circular hole 10 such that their cross-sections have concentric circles, a work for finishing the stopper member 7 with a predetermined outer diameter dimension can be carried out relatively easily. Since the stopper member 7 is processed in this way, the tip end portion of the stopper member 7 can be placed at the inner side of the second circular hole 10 such that there is a space (gap)

between the tip end portion of the stopper member 7 and the second circular hole 10 merely by fitting the stopper member 7 into the first circular hole 9. This layout of the stopper member 7 can be realized by a combination of the hole of the circular cross-section and the cylindrical shape of the stopper member 7. This is because the combination of the hole of the circular cross-section and the cylindrical shape of the stopper member 7 can attain a state in which center axes of them (hole and cylinder) conform to each other more accurately than a combination of another shapes, such as a hole of a rectangular cross-section and a rectangular column shape of the stopper member. Therefore, regarding another hole (corresponding to the second circular hole 10 in the present embodiment) having a cross-sectional shape which is concentric with the hole (corresponding to the first circular hole 9 in the present embodiment) having the circular cross-section, its center axis and a center axis of the cylindrical shape (corresponding to the stopper member 7 in the present embodiment) conform to each other accurately. As a result, in accordance with the load cell 1 of the present embodiment, a mounting work of the stopper member 7 can be carried out accurately and easily.

Figure 4A:
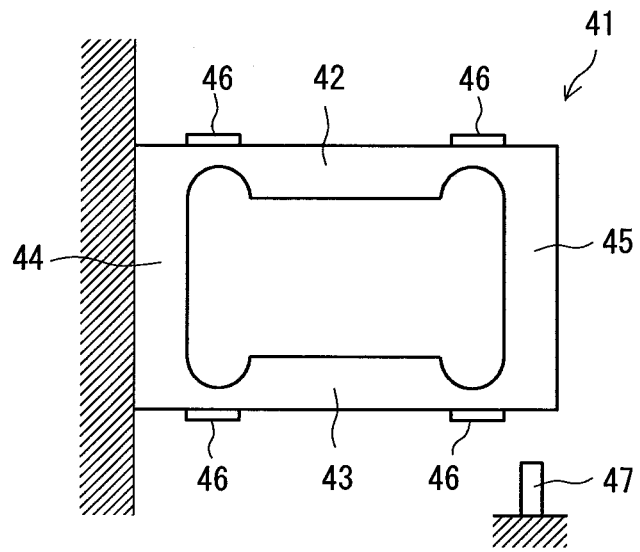
FIG. 4 is a view showing a schematic configuration of a general Roberval-type load cell.
Figure 4B:
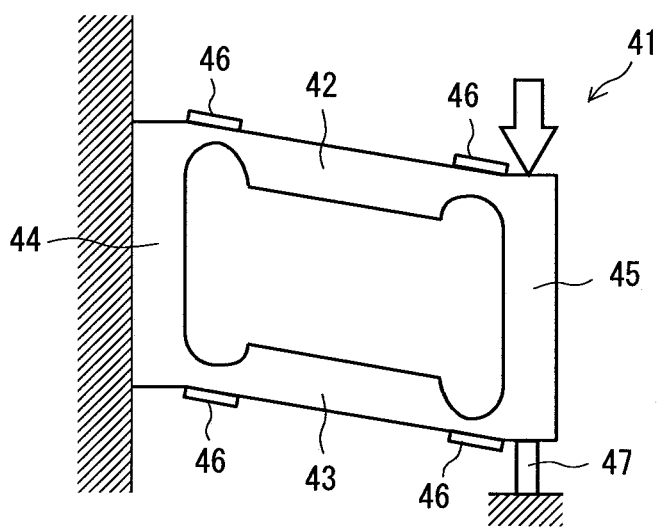
Figure 5:
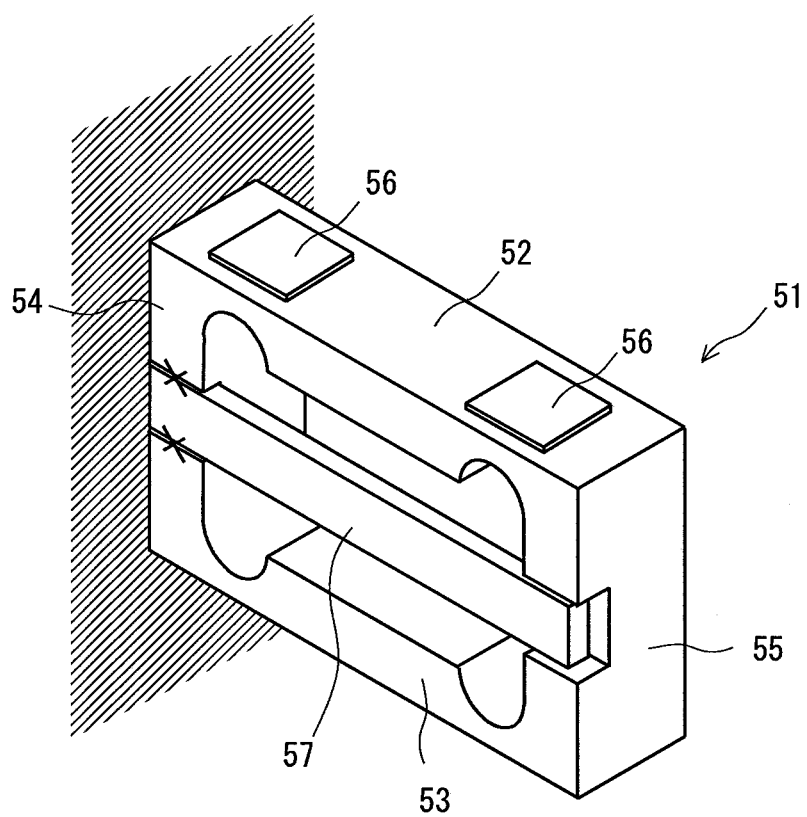
FIG. 5 is a perspective view of a conventional load cell including an excess load preventing mechanism.

In some cases, a force applied to a load cell contains a horizontal component. In these cases, the load cell is displaced vertically in a twisted state. If the conventional load cell of FIG. 4 or 5 is twisted, a space (distance) between the stopper member and a member facing the stopper member decreases. This causes the stopper member to act regardless of a small vertical displacement amount of the load cell. However, in accordance with the present embodiment, the stopper member 7 and the second circular hole 10 have the circular cross-sections, a space (distance) between the stopper member 7 and the second circular hole 10 in a vertical direction does not change even when the load cell (load cell body 6) is twisted. Therefore, regardless of whether or not the load cell (load cell body 6) is twisted, the stopper member 7 always acts in the same displacement position. That is, the stopper member can act properly even when the load cell is twisted.

Embodiment 2

Next, the load cell 1 according to Embodiment 2 of the present invention will be described. The load cell 1 of the present embodiment has basically the same configuration as that of the load cell 1 of Embodiment 1, except as follows. In the load cell 1 of Embodiment 1, the inner diameter of the first circular hole 9 is equal to the inner diameter of the second circular hole 10, and the outer diameter of base end portion of the stopper member 7 is greater than the outer diameter of the tip end portion of the stopper member 7, whereas in the load cell 1 of the present embodiment, the inner diameter of the first circular hole 9 is smaller than the inner diameter of the second circular hole 10, and the outer diameter of base end portion of the stopper member 7 is equal to the outer diameter of the tip end portion of the stopper member 7. That is, the stopper member 7 of the present embodiment has a cylindrical shape with no stepped portion (with no dimension difference), and the inner diameter of the first circular hole is different from the inner diameter of the second circular hole.

More specifically, the stopper member 7 of the present embodiment has the cylindrical shape, and has a uniform outer diameter dimension from its base end to its tip end to cause the stopper member 7 to be fastened to the first circular hole 9 in a state in which it is inserted into the first circular hole 9. By comparison, the first circular hole 9 is formed to have an inner diameter dimension to allow the stopper member 7 to be fastened to the first circular hole 9 in a state in which it is inserted into the first circular hole 9, while the second circular hole 10 is formed to have an inner diameter dimension to allow a space (gap) of a predetermined width to be formed between the stopper member 7 and the second circular hole 10 in a state in which it is inserted into the second circular hole 10.

In the above configuration of the load cell 1 of the present embodiment, the base end portion of the stopper member 7 is fastened to the first circular hole and the tip end portion is located at the inner side of the second circular hole such that there is a slight space (gap) between the tip end portion and the second circular hole 10. Because of this configuration, when the movable section 5 is displaced by the width of the space (gap), the inner surface of the second circular hole 10 contacts the outer surface of the stopper member 7, thereby restricting movement of the movable section 5. This makes it possible to prevent damages to the load cell 1 (strain gauges 8) which would be caused by application of an excess load to the load cell 1.

Next, manufacturing process steps of the load cell 1 of the present embodiment will be described. FIG. 3 is a view showing the manufacturing process steps of the load cell of the present embodiment. Hereinafter, the manufacturing process steps will be described with reference to FIGS. 3A to 3D.

Initially, as shown in FIG. 3A, the stopper member 7 is processed. Specifically, a turning process is carried out in such a manner that the stopper member 7 is rotated around its center axis, and its side surface is turned off by a turning tool, etc. In this turning process, the stopper member 7 is turned off to a dimension which allows the stopper 7 to be fitted to the first circular hole 9 in a state in which the stopper member 7 is inserted into the first circular hole 9.

Then, as shown in FIG. 3B, the load cell body 6 is processed. Specifically, a material of a rectangular-parallelepiped shape is hollowed out by a drill and the like, using a milling machine, and the upper beam section 2, the lower beam section 3, the fastening section 4, and the movable section 5 are formed. Alternatively, the load cell body 6 may be formed in such a manner that the upper beam section 2, the lower beam section 3, the fastening section 4, and the movable section 5 may be manufactured separately, and assembled by means of screws. Thereafter, the first circular hole 9 and the second circular hole 10 are formed at the same time by manipulating a drill in a direction from the outer peripheral surface side of the fastening section 4 or from the outer peripheral surface side of the movable section 5. The second circular hole is formed to have a greater inner diameter than the first circular hole by manipulating another drill having a greater outer diameter. The inner diameter of the first circular hole 9 is made to have a dimension to allow the stopper member 7 to be fastened to the first circular hole 9 in a state in which the stopper member 7 is inserted into the first circular hole 9. The second circular hole 10 is made to have a dimension to allow a gap of a predetermined width to be formed between the stopper member 7 and the second circular hole 10 in a state in which the stopper member 7 is pressed and inserted into the second circular hole 10. Thus, the first circular hole 9 and the second circular hole 10 which are coaxial with each other and different in inner diameter are formed in the fastening section 4 and the movable section 5, respectively.

Then, as shown in FIG. 3C, the stopper member 7 is inserted into the load cell body 6 from the outer peripheral surface side of the movable section 5. Specifically, the stopper member 7 is inserted into the second circular hole 10 and further toward the first circular hole 9. Since the outer diameter of the stopper member 7 is smaller than the inner diameter of the second circular hole 10, the stopper member 7 can be inserted without a resistance to a location of the first circular hole 9.

Then, as shown in FIG. 3D, the stopper member 7 is fastened to the load cell body 6. Specifically, the stopper member 7 is further inserted toward the fastening section 4 in the state of FIG. 3C. As described above, the stopper member 7 is formed to have a dimension to allow the stopper member 7 to be fastened to the first circular hole 9. Therefore, when the stopper member 7 is inserted into the first circular hole 9, the stopper member 7 is fastened to the first circular hole 9. Finally, the strain gauges 8 are attached (bonded) to predetermined locations, respectively, thereby completing the load cell 1 of the present embodiment.

The manufacturing process steps of the load cell 1 of the present embodiment have been described above. As should be appreciated from the above, processing for forming the first circular hole 9 and the second circular hole 10 such that their cross-sections have concentric circles, a work for finishing the stopper member 7 with a predetermined outer diameter dimension can be carried out relatively easily. Since the stopper member 7 is processed in this way, the stopper member 7 can be placed at the inner side of the second circular hole 10 such that there is a space (gap) between the tip end portion of the stopper member 7 and the second circular hole 10 merely by fitting the stopper member 7 into the first circular hole 9. As a result, in accordance with the load cell 1 of the present embodiment, a mounting work of the stopper member 7 can be carried out accurately and easily.

Thus far, Embodiment 1 and Embodiment 2 of the present invention have described with reference to the drawings. Specific configurations are not limited to the embodiments, and design change and the like can be made without departing a scope of the invention, and are included in the present invention.

INDUSTRIAL APPLICABILITY

In accordance with the present invention, it is possible to provide a load cell which makes it possible to carry out a work for mounting a stopper member accurately and easily. Therefore, the present invention is useful in technical fields of load cells.

REFERENCE SIGNS LISTS

1 load cell
2 upper beam section
3 lower beam section
4 fastening section
5 movable section
6 load cell body
7 stopper member
8 strain gauge
9 first circular hole
10 second circular hole

The invention claimed is:

1. A load cell which is Roberval-type load cell, comprising:
an upper beam section extending horizontally;
a lower beam section extending below the upper beam section in parallel with the upper beam section;
a fastening section which connects one end of the upper beam section and one end of the lower beam section to each other and is fastened to a stationary object;
a movable section which connects the other end of the upper beam section and the other end of the lower beam section to each other and is displaced vertically by a load applied vertically to the movable section; and
a cylindrical stopper member having a circular cross-section;
wherein the fastening section has a first circular hole having a circular cross-section, and wherein the first circular hole is a through-hole and penetrates the fastening section;
wherein the movable section has a second circular hole having a circular cross-section, and wherein the second circular hole is a through-hole and penetrates the movable section, and further wherein the second circular hole is concentric with the first circular hole;
wherein a base end portion of the stopper member is fitted into and fastened to the first circular hole and a tip end portion of the stopper member is located at an inner side of the second circular hole such that there is a space of a specified width between the tip end portion and an inner surface of the second circular hole and
wherein the upper beam section, the lower beam section, the fastening section and the movable section form a parallelogram, and wherein the lower beam section and the upper beam section are parallel to the stopper member, and wherein the upper beam section and the lower beam section are parallel to a center axis of the first circular hole and the second circular hole.

2. The load cell according to claim 1,
wherein the first circular hole has an inner diameter equal to an inner diameter of the second circular hole; and
wherein the tip end portion of the stopper member has an outer diameter smaller than an outer diameter of the base end portion of the stopper member.

3. The load cell according to claim 1,
wherein the first circular hole has an inner diameter smaller than an inner diameter of the second circular hole; and
wherein the tip end portion of the stopper member has an outer diameter equal to an outer diameter of the base end portion of the stopper member.

* * * * *